Patented Nov. 22, 1927.

1,650,157

UNITED STATES PATENT OFFICE.

RUDOLF SCHENCK, OF MUNSTER, GERMANY, ASSIGNOR TO VEREINIGTE STAHLWERKE AKTIENGESELLSCHAFT, DUSSELDORF.

PROCESS FOR THE ELIMINATION OF PHOSPHORUS FROM PIG IRON.

No Drawing. Application filed December 24, 1925, Serial No. 77,614, and in Germany September 11, 1924.

The elimination of phosphorus from pig iron is generally effected simultaneously with the elimination of the carbon by the basic refining-processes in the Thomas-converter or in the Siemens-Martin furnace.

It is however also possible to withdraw the phosphorus from the pig iron without diminishing the quantity of carbon.

It is known since the seventieth of the last century that it is possible to transfer the phosphorus from the liquid pig iron into the slag by having oxidizing agents acted upon the pig iron in the presence of slags of a highly basic character at temperatures which are not essentially higher than those at which the pig iron is smelting. By this process the carbon is not oxidized, and the formation of carbon oxide only begins when the temperature has arisen. During the combustion of the carbon the oxidation of the phosphorus is stopped and does not recommence before the carbon is completely eliminated from the metal bath. This behaviour is in conformity with the experiences which have been made later on at the Thomas-process. At these low temperatures the phosphorus is split up in a remarkably quick manner (compare Ledebur, "Handbuch der Eisenhüttenkunde", 4th edition, page 696). These facts are confirmed by the observations made at the Hösch-process, in the first phase of which use is made of the possibility of dephosphorizing the iron in the presence of lime at temperatures somewhat above the smelting-point of pig-iron (compare Fr. Springorum, dissertation Aachen 1910).

This invention consists in a process at which, without employing elementary oxygen or ores consisting of oxides, use is made of the capability of the carbon-oxide to disengage its oxygen by a special treatment under simultaneous formation of carbides.

In the metallurgical chemistry of the iron equilibriums and reversible reactions have a great importance. Small changes of temperature or of concentration of the substances taking part in the reactions are often sufficient to reverse the normal reaction. Experiments have shown that the iron in the liquid state reacts with carbon oxide, forming soluble carbide and partially soluble ferrous oxide, corresponding to the following equation:

(1) $4Fe + CO \rightleftharpoons Fe_3C + FeO$.

Low temperatures favour the formation of the substances standing on the right-hand side of the equation and higher ones those of the left-hand side of the equation; growing pressures of carbon oxide change the equilibriums towards the right-hand side.

In a corresponding manner the reaction between iron phosphide and carbon oxide according to the following equation:

(2) $6CO + 13Fe + 2Fe_3P \rightleftharpoons 6Fe_3C + Fe(PO_3)_2$ is also reversible, and with this reaction the equilibrium is influenced in the same sense as the equilibrium mentioned above. Especially the admixture of lime favours the right-hand side, since by its addition non-reducible tertiary calcium phosphate is formed, which diminishes the concentration of the iron metaphosphate and the tendency of the formation of iron phosphide. At temperatures somewhat above the point at which the pig iron is solidified the metallic iron containing carbide is not as much oxidized by carbon oxide as the iron phosphide in the presence of lime. At these temperatures iron phosphide is a more efficient reducing agent for carbon oxide than the liquid metal. At higher temperatures these reactions occur in a different manner. Or with other words: With corresponding concentrations of the reacting substances iron carbide will reduce more vigorously ferrous oxide than tertiary phosphate. Of course the oxidizing energy of the carbon oxide increases with its partial pressure.

By these transformations iron carbide is formed. The reactions 1 and 2 occur simultaneously so far as the processes are in accordance with the equilibriums. The reaction 1 proceeds only until a certain quantity of iron carbide is formed, whereas the reaction 2 does not stop at an equilibrium because the metaphosphates are transformed in the nascent state into substances which hinder the inverse reaction.

The reaction of the carbon oxide is in both cases an exothermic one and sets free, especially in the second case, a considerable quantity of heat which amounts to 3710 calories per kg. phosphorus, that is to say it amounts to about two-thirds of that heat which is won by the combustion of phosphorus with oxygen.

The technical accomplishment of the invention is effected by blowing carbon oxide gas in a Thomas-converter under admixture of lime or other basic materials. Instead of employing pure carbon-oxide it is also possible to use industrial gases rich in carbon-oxide, such as producer gases or blast-furnace gases. It is also possible to employ other devices which are suitable for the reaction of liquid pig iron, lime and carbon-oxide.

What I claim and desire to secure by Letters Patent of the United States is:—

1. A process for the elimination of phosphorus from pig iron without a previous blowing of the pig iron with air, which comprises bringing the pig iron into simultaneous reaction with carbon monoxide and basic materials.

2. A process for the elimination of phosphorus from pig iron without a previous blowing of the pig iron with air, which comprises bringing the pig iron into simultaneous reaction with gases rich in carbon monoxide and basic materials.

3. A process for the elimination of phosphorus from pig iron without a previous blowing of the pig iron with air, which comprises bringing the pig iron into simultaneous reaction with carbon monoxide and basic materials at a temperature not essentially higher than the melting-point of pig iron.

4. A process for the elimination of phosphorus from pig iron without a previous blowing of the pig iron with air, which comprises bringing the pig iron into a Thomas converter under simultaneous blowing in carbon monoxide and addition of lime.

PROF. DR. SCHENCK.